H. Baker,
Converting Motion.
No 9,761. Patented June 7, 1853.
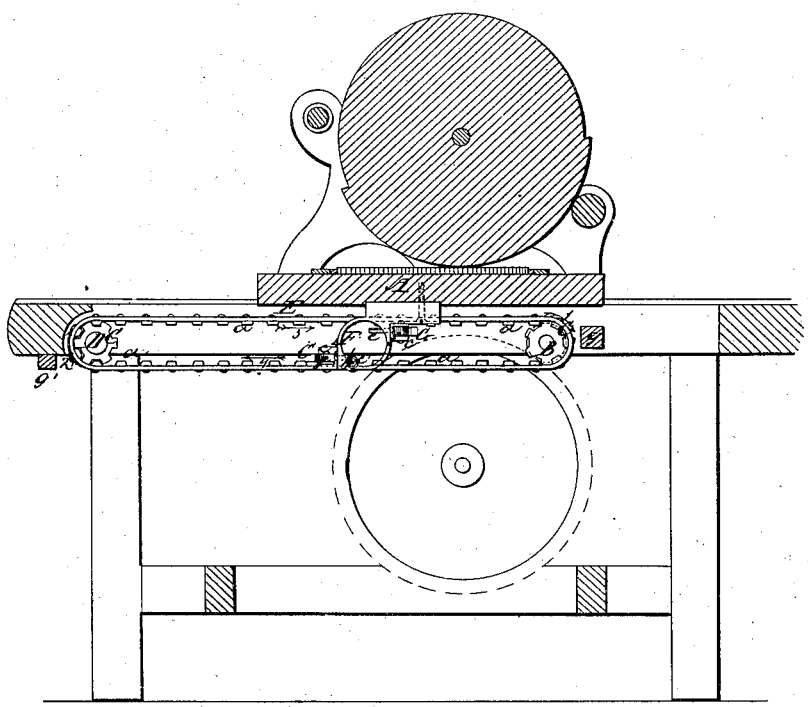
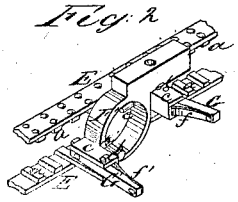
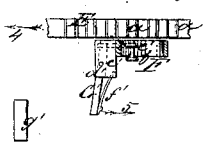

UNITED STATES PATENT OFFICE.

HENRY BAKER, OF CATSKILL, NEW YORK.

CONVERTING ROTARY INTO RECIPROCATING MOTION.

Specification of Letters Patent No. 9,761, dated June 7, 1853.

*To all whom it may concern:*

Be it known that I, HENRY BAKER, of Catskill, in the county of Green and State of New York, have invented a new and useful Improvement in Means of Converting Rotary into Reciprocating Rectilinear Motion; and I do hereby declare that the following is a full, clear, and exact description of the same, reference being had to the accompanying drawings, forming part of this specification, in which—

Figure 1, is a longitudinal vertical section of the principal parts of a cylinder printing press whose bed receives reciprocating rectilinear motion through the agency of my improvement. Fig. 2, is a perspective view of the parts which constitute the improvement, detached; and Fig. 3, is a horizontal section of the same.

Similar letters of reference indicate corresponding parts in each of the several figures.

This invention is more particularly designed for the purpose of driving the bed of a printing press, or the bed or any other part of any machine to which it is desired to communicate a reciprocating rectilinear motion from a revolving shaft, but it is also applicable in almost every case where the said change of motion is required. The motion is communicated in the first place from the revolving shaft to one of two wheels or pulleys around which an endless belt or chain is placed, the said wheels or pulleys and belt or chain being so arranged that the belt will move in a direction parallel or nearly so with the desired reciprocating movement. To the object which is to receive the reciprocating movement, is attached a ring which lies nearly close to the belt or chain, the inner diameter of the said ring being about equal to that of the pulleys on which the belt or chain runs. Two pins are fitted to slide freely through the periphery of the ring on opposite sides, both the said pins being parallel with the band and being caused by springs applied to them to project a short distance into the ring. To the endless band or chain is attached a stud which projects into the ring close within its periphery at right angles to the above named pins, and as the band moves this stud catches one or other of the pins and propels the ring and whatever is connected with it. As that part of the endless belt or chain which is on one side of the wheels or pulleys moves in the opposite direction to that on the other side, the stud will move in opposite directions alternately. The sliding pins are so placed that when the stud moves in one direction, it catches with one, and when it moves in the other direction, with the other; and each of the pins being drawn back from the ring by a lever attached to it catching against a stop, at the time the stud reaches either wheel or pulley, it is passed by the stud, which runs around the wheel or pulley with the belt or chain, and catches the other pin and by its reversed movement drives back the ring in the opposite direction to that in which it moved before the stud arrived at the wheel or pulley.

To enable those skilled in the art to make and use my invention I will proceed to describe its construction and its practical application.

A, (Fig. 1) is the bed of the printing press, and B, the revolving shaft by which it is to be driven. The revolving shaft carries a toothed wheel C, fast upon it, and a similar toothed wheel C', is hung loosely on a stationary stud D, the axes B, and D, of both wheels being at an equal distance from the intended line of the bed's movement. E, is a leather belt which passes around both wheels C, C', and is furnished on its inner side with teeth $a$, $a$, similar to gearing cogs, the said teeth being riveted to it at suitable distances apart to gear into the wheels C, C'. To one of the teeth is secured the stud $b$.

F, is the ring which is secured to the bed A, by screws; it is of metal and has two knuckle pieces $c$, $c'$, on opposite sides, the said knuckle pieces being for the purpose of receiving the fulcra $d$, $d'$, Fig. 2 of two small levers G, G', to which the sliding pins $e$, $e'$, are attached, the said pins $e$, $e'$, passing through the ring, $e$, near the upper part of the band, and $e'$ near the lower part. The springs $f$, $f'$, are applied to the levers to keep the points of the pins $e$, $e'$, projecting into the ring. The stops $g$, $g'$, by which the levers are caused to draw back the pins are attached to the frame of the press.

The shaft B, and wheel C, revolve in the direction of the arrow 1, and the belt moves in the direction of the arrows 2, 3, 4. The stud $b$, is shown to be below the wheels C, C', and hence moving in the direction of the arrow 4, catching against the periphery of the ring under the pin $e'$, and driving the bed A, in the same direction. The motion will continue in this direction until the stud *b*, arrives nearly under the axis of the wheel C', when the end of the lever G', will come in contact with the stop *g'* and as the belt carries the ring onward, an effect will be produced equivalent to moving the end of the lever in the direction of the arrow 5, this will withdraw the point of the pin *e'*, from within the ring, and thus the stud *b*, ceases to act upon the ring, which becomes stationary. The stud being carried around the wheel C', passes around the inside of the ring, till it catches above the pin *e*, by which time it will commence moving in the direction of the arrow 3, driving the ring and the bed in the same direction. This motion continues until just before the stud arrives over the axis of the wheel C, when the lever G, comes in contact with the stop *g*, and the pin *e*, is withdrawn. The stud is then carried around the ring till it arrives under the pin *e'*, whose point was thrown back into the ring by the spring *f'*, the instant the lever G, left the stop *g'*. The motion of the ring and bed then proceed again in the direction of the arrow 4, the point of the pin *e*, being returned into the ring when the lever G, has left the stop *g*. In this manner the operation proceeds, the pins *e*, *e'*, being withdrawn alternately at the end of the movement of the ring in each direction to allow the stud *b*, to pass around to the opposite side into contact with the opposite pin.

I do not claim giving a reciprocating motion to an object by connecting it alternately to opposite sides of a moving endless belt or chain; but,

What I claim as my invention and desire to secure by Letters Patent, is—

The ring F, with its sliding pins *e*, *e'*, attached to the object to which reciprocating motion is to be given, in combination with the stud *b*, or its equivalent attached to the endless chain or band substantially as herein set forth—the points or ends of the said pins *e*, *e'*, being caused to project through to the interior of the ring to catch the stud *b*, or equivalent, and being withdrawn alternately to allow it to pass, by springs, levers, and stops substantially as described.

HENRY BAKER.

Witnesses:
 EPHRAIM BAKER,
 GEORGE S. CHAMBERLIN.